May 5, 1964    V. M. KRAMER ETAL    3,131,954
RUBBER TUBE WITH ENCLOSED METAL RING
Filed Sept. 4, 1959    2 Sheets-Sheet 1
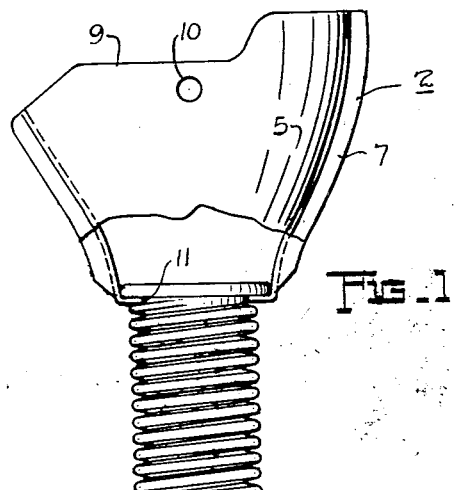
Fig. 1
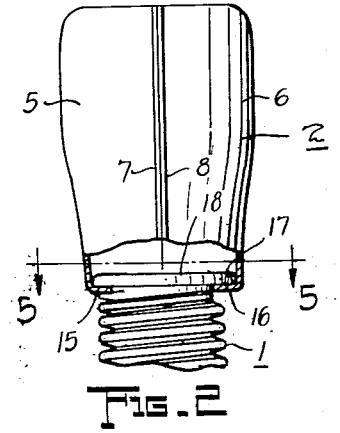
Fig. 2
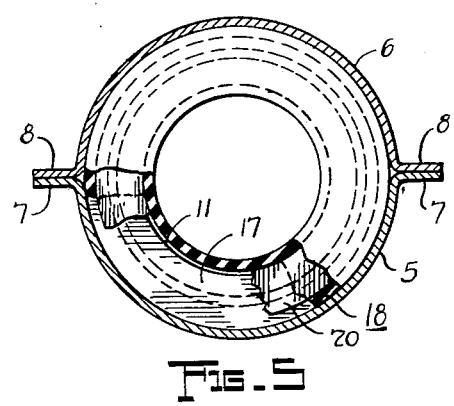
Fig. 5
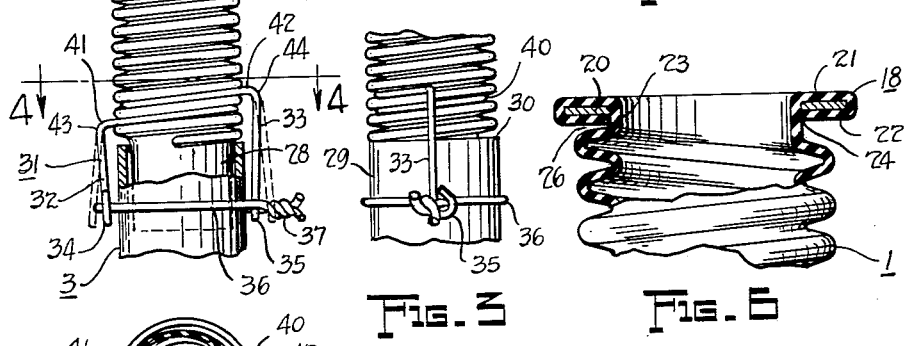
Fig. 3    Fig. 6
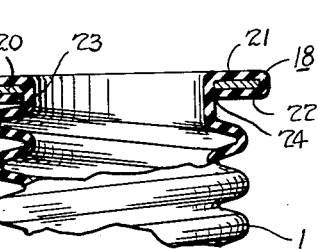
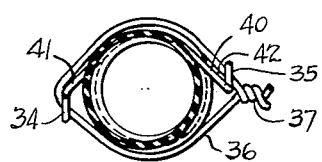
Fig. 4
INVENTORS,
VANCE M. KRAMER,
LAWRENCE W. CARLTON
BY Bosworth, Sessions,
Herstrom and Knowles.
ATTORNEYS.

May 5, 1964 V. M. KRAMER ETAL 3,131,954
RUBBER TUBE WITH ENCLOSED METAL RING
Filed Sept. 4, 1959 2 Sheets-Sheet 2

INVENTORS,
VANCE M. KRAMER,
LAWRENCE W. CARLTON

BY Bosworth, Sessions,
Herrstrom and Knowles
ATTORNEYS

United States Patent Office 3,131,954
Patented May 5, 1964

3,131,954
RUBBER TUBE WITH ENCLOSED METAL RING
Vance M. Kramer, Perrysburg, and Lawrence W. Carlton, North Baltimore, Ohio (both % Crushproof Tubing Co., McComb, Ohio)
Filed Sept. 4, 1959, Ser. No. 838,199
6 Claims. (Cl. 285—238)

This invention relates to the art of connecting rubber tubes, particularly corrugated flexible tubes, to and between rigid parts of machines and appliances.

The invention has for its principal object the provision of improved means for securely attaching an end of a rubber tube to a rigid machine part having a circular opening to receive the tube end, the organization being such that the connection of the tube to the rigid part can be quickly and easily made by persons not having specialized skill and without the use of special tools or equipment.

A related object is to provide a rubber tube having on one end a retainer structure constituting one component of an interlocking connection, the other component of which may be provided on the rigid part to which the tube is to be connected. More specifically this aspect of the invention contemplates an arrangement in which a rigid ring, as of metal, is suitably enclosed or sheathed in the rubber of the tube at one end of the latter and, when positioned within the opening of the rigid part to which the tube is to be attached, reacts against a shoulder surrounding the opening to prevent withdrawal or separation of the tube from such part. According to a particularized version, the rigid ring surrounds the rubber tube and an integral end portion of the tube is stretched, wrapped and folded around such ring. As a further refinement the invention contemplates enveloping the rigid metal ring in the rubber of the tube when the latter is in a raw or partially cured condition and then completing the cure of the rubber with the metal ring in place so that the rubber permanently takes the shape to which it is distorted and stretched in wrapping it about the ring.

Another object is to provide a corrugated rubber tube organized with a rigid circular ring in such a way that the ring is enclosed in the rubber of the tube and the ring and the enclosing rubber constitute a radial retaining flange with the tube having corrugations of smaller diameter than the retaining flange so that the rigid ring and the rubber in which it is enclosed project radially beyond the corrugations of the tube for interlocking association with a radial abutment inside the opening of a rigid part to which the tubing is to be attached. As a specialized version of this aspect of the invention, the rubber tubing has a corrugated body portion and the endmost corrugation constitutes an outwardly directed radial projection receivable against the outside of the rigid member to which the tubing is attached, thereby preventing axial shifting of the tubing in both directions relative to the rigid part.

Another object is to provide such a combination of rubber tubing and enclosed ring in which the ring is flat and provides a relatively wide thrust area for transmitting axial forces between the tube and the rigid part to which the tube is attached.

Another object is to provide a joint structure for coupling one end of a corrugated rubber tube to a rigid tubular member in such a way that the tubing can be easily disconnected and reconnected for replacement or repair.

Another object is to provide a simple and inexpensive method of manufacturing a rubber tube with a corrugated flexible body portion and a rigid retainer enclosed in one end. More particularly the invention is concerned with the tube making method which involves primary shaping and partial curing operations to produce a semi-cured preform and secondary shaping and curing operations to produce a final product, it being an objective to organize the partially cured tube and the rigid retainer into a suitable combination at the preform stage so that in the secondary curing operation the rubber of the tube is caused to take permanent shape as a sheath about the retainer without bonding thereto. As a further refinement of the process applicable to the making of a tube and retainer combination of the type in which the retainer is a circular ring and the tube has relatively deep closely spaced corrugations to obtain extreme flexibility and extensibility, the retainer is enclosed by wrapping it in a tubular portion on the end of the rubber preform with the circular margin of the wrapping portion embracing and abutting the body of the preform and with such margin engaged between and held in place during curing by the retainer ring and the endmost corrugation of the preform body.

Other objects and advantages relate to structural features, combinations and arrangements of parts of the flexible tube, the connector joint and the fitting and to the process for making the rubber tube with the rigid retainer ring enclosed in one end. The invention is described in connection with the accompanying drawings forming a part of the specification and illustrating a preferred embodiment and method representing the best known mode of practicing the invention.

In the drawings:

FIG. 1 is a fragmentary elevational view, partly in section and with parts broken away and removed showing a spiral corrugated flexible rubber tube or hose connected between the upper funnel or spout and the lower boot of an agricultural implement such as a seed or fertilizer drill;

FIG. 2 is a fragmentary side elevational view, partly in section and with parts broken away and removed of the spout and the upper portion of the flexible rubber tube of FIG. 1;

FIG. 3 is a fragmentary side elevational view of the implement boot and the lower portion of the flexible tube of FIG. 1;

FIG. 4 is a sectional detail, with parts removed, taken substantially in the plane indicated by the line 4—4 of FIG. 1;

FIG. 5 is a top end view of the rubber tube, partly in section and with parts broken away to show the enclosed rigid retaining ring, this view being enlarged relative to the preceding figures;

FIG. 6 is a fragmentary elevational view, partly in section of the upper portion of the flexible tube, this view being drawn to the same scale as FIG. 5;

Figure 7:
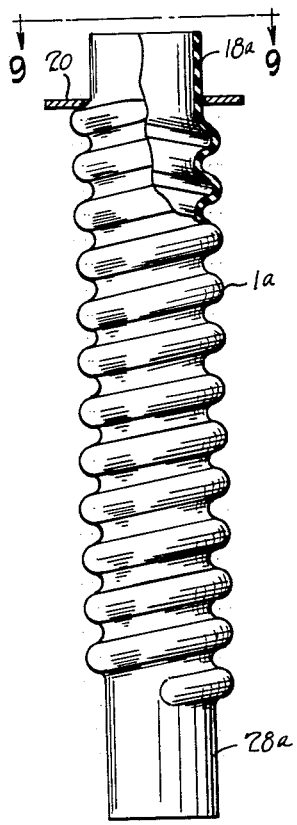
FIG. 7 is a somewhat diagrammatic elevational view, partly in section and with parts broken away and removed showing a partially cured preform of the flexible rubber tube or hose of the preceding figures and also showing the rigid retainer ring positioned to be wrapped within the rubber at one end of the tube, this view representing an intermediate stage of the tube making process.
Figure 8:
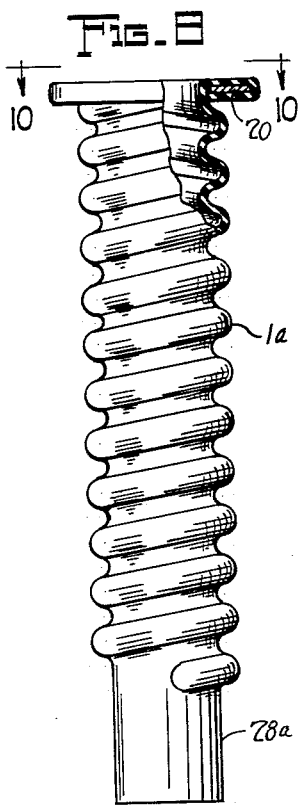
FIG. 8 is an elevational view, partly in section and with parts broken away and removed, similar to FIG. 7, and illustrating a succeeding stage in the process.
Figure 9:
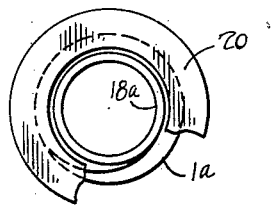
Figure 10:
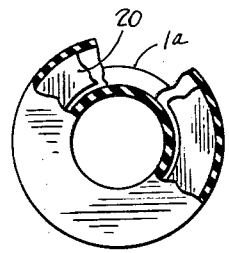
Figure 11:
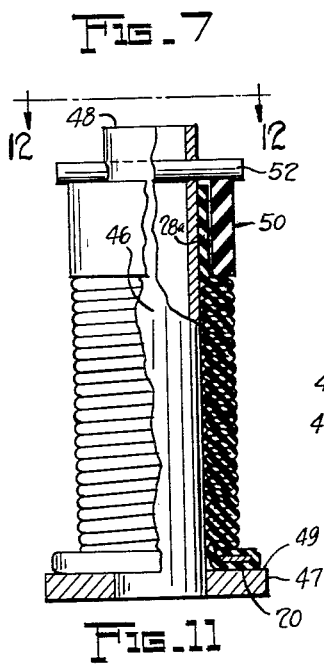
Figure 12:
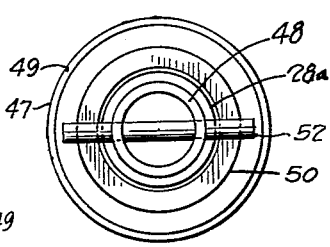
Figure 13:
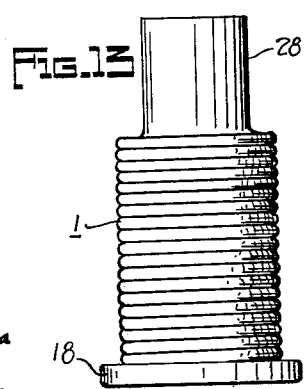

FIGS. 9 and 10 are top end views of the rubber tube and retainer ring as shown in FIGS. 7 and 8, these views having parts broken away and being taken approximately in the planes indicated by the lines 9—9 and 10—10, respectively of FIGS. 7 and 8;

FIG. 11 is an elevational view, partly in section and with parts broken away and removed showing the tube mounted on a curing mandrel or support and held thereby in axially compressed condition relative to the preform shape of FIGS. 7 and 8, this view showing the rigid retainer ring enclosed in the lower end of the hose and the axial compressive force applied to the endmost corrugation in a circle surrounding the juncture of the corrugated body and the cylindrical end portion of the tube to eliminate axial compression of the latter;

FIG. 12 is a top plan view of the curing form and hose of FIG. 11, being taken approximately in the plane represented by the line 12—12 of FIG. 11; and FIG. 13 is an elevational view of the corrugated rubber hose with the enclosed rigid metal ring at its lower end after curing and removal from the curing form.

Various types of agricultural implements such as seeding and fertilizing drills or rigs employ flexible tubes connected between containers or boxes carried by the supporting framework of the vehicle and distributing devices or boots which travel along the surface of the ground. In one arrangement, the outlets of the seed or fertilizer boxes are disposed to drop the bulk material, as it is released by suitable escapement means, into funnels or spouts suitably suspended from the boxes or escapements. The flexible hoses are connected at their upper ends to the outlets of the spouts and at their lower ends to the intake tubes of the boots.

Referring to FIG. 1, there is shown a rubber tube 1 comprising a body portion having a spirally corrugated wall that imparts extreme flexibility and longitudinal stretch to the tube. The upper end of the tube is connected to the outlet of a spout 2 of an agricultural implement such as a seeding or fertilizing rig of the type referred to. The lower end of the rubber hose is connected to the inlet of distributing boot 3 of such implement or rig.

The spout 2 is a rigid part of the implement and may be of cast metal or, as shown, of complemental steel stampings 5, 6 having marginal flanges 7, 8 secured together as by spot welding. The spout is in the nature of a funnel and has its upper edge 9 contoured to fit the box and escapement mechanism of the particular agricultural implement with which it is used. Provision is made, as by holes, one of which is shown at 10, for receiving fasteners such as bolts for attachment of the spout in suspended relation and in desired position on the rig.

At its lower end the spout 2 is formed with a circular outlet 11 defined as by the inner edges of arcuate flanges 15, 16 integrally formed on the lower ends of the stampings 5, 6. These inturned arcuate flanges provide an internal radial face or shoulder 17 surrounding the outlet 11, the internal shoulder being engageable by an outwardly directed circular retaining flange 18 on the upper end of the flexible tube.

As shown to advantage in FIGS. 5 and 6 the hose flange 18 comprises a flat circular ring 20 of rigid material, being suitably formed as a stamping of steel or other suitable metal alloy. The rigid ring is completely enclosed in the rubber of the hose, or substantially so, so as to be protected against water and chemicals that might cause it to rust or otherwise deteriorate. The enclosing rubber is in the form of a hollow annulus or sheath which, in its normal unstressed condition comprises a pair of annular rings 21, 22 disposed in axially spaced confronting relation. The upper or outer ring 21 is integrally connected about its inner periphery to neck portion 23 of the rubber tube. About its outer periphery the upper ring is integrally connected to the outer periphery of the lower or inner ring 22. Thus the hard or rigid metal ring 20 constitutes a third ring sandwiched between the rubber sheathing rings 21, 22 and is held captive thereby. The hollow rubber sheath portion of the retainer 18 completely encloses the rigid metal stiffener ring 20 and thereby insulates the latter from contact with the metal of the spout 2, thereby eliminating wearing and rattling. The inner periphery of the lower rubber ring 22 is disposed closely adjacent to, preferably abutted against the outside surface of the tube at the juncture of the corrugated body and the circular neck 23. There is no bond connecting the inner periphery of the ring 22 to the neck, the abutment line being along a circular slit indicated at 24. The inner ring 22 may thus be bent outwardly to uncover the rigid steel ring 20 for removal and replacement of the latter should it be desired to do so as in assembling the flexible hose with a rigid machine part.

The corrugations comprising the body of the tube 1 are integral with the rubber neck 23 and in the unstressed normal or straight condition of the rubber tube the internal and external crests of the corrugations define cylinders which are smaller than the inner and outer peripheries, respectively, of the rigid retainer ring 20. Although the neck 23 is shown with an internal diameter equal to the diameter of the cylinder defined by the internal crests of the corrugations, it is contemplated that the neck may have a relatively larger diameter. It is preferable for the outer periphery of the retainer ring 20 to be of larger diameter than the external crest cylinder to facilitate assembly of the flexible tube with the spout 2 as by inserting the tube lower end foremost downwardly through the spout until the flat circular lower surface of the retainer 18 engages the circular radial shoulder 17 of the spout. In this position, with the arcuate flanges 15, 16 of the spout projecting into annular groove 26 (FIG. 6) provided between the retainer flange 18 and the first corrugation of the tube, the tube is effectively located relative to the spout, and strongly resists being shifted laterally, pulled out or pushed upwardly into the interior of the spout through the opening 11.

At its lower end the flexible tube 1 is formed with an integral cylindrical connector portion 28 received telescopically within cylindrical tube upper end portion 29 of the metal boot 3. The connector portion 28 is of less diameter than the external crest cylinder diameter of the corrugations of the rubber tube 1. Thus the lowermost turn of the corrugated body is seated against circular upper end face of the boot 3.

To retain the body of the tube 1 seated against, and its connector portion 28 within, the upper end socket of the boot, a bent wire fitting 31 encircles the corrugated body of the hose in interfitting relation and has depending legs 32, 33 which extend downwardly on diametrically opposite sides of and in spaced relation to the upper end 29 of the boot. At their lower ends the fitting legs are formed as by bending with terminal eyes 34, 35 through which is threaded and thereby held captive a flexible binding or tying element such as soft iron wire 36, this wire being adapted to be placed or wrapped about the boot in embracing relation and suitably drawn tight as by crimping or by having its ends twisted together as indicated at 37 to shorten and tension it. The tensioning of the binding element 36 deforms the fitting 31 by drawing the legs 32, 33 toward one another as from the broken line to the full line positions shown in FIG. 1. In this manner the stress in the deformed fitting 31, which is made of high strength steel alloy spring wire of about ⅛" diameter, maintains tension in the binding element 36 so that the latter tightly holds the external cylindrical surface of the boot 3 in a frictional grip and resists separation of the flexible tube from the boot.

Central body portion 40 of the fitting 31 is in the form of a helical coil comprising at least a full turn adapted to seat in the bottom of the external groove defining the corrugations of the rubber hose. Extending tangentially from the helical body portion 40 are connecting portions 41, 42 from the outer ends of which depend the leg portions 32, 33 connected thereto by right angle bends 43, 44, respectively, in the spring wire of which the fitting is formed. The connecting wire portions 41, 42 locate the leg portions 32, 33 in spaced relation radially outwardly from the corrugations of the rubber tube to prevent chafing and rubbing, contact between the tube and the fitting being restricted to those surface portions of the rubber tube at and adjacent the bottom of the spiral groove which defines the corrugations.

To make a flexible tube of the type illustrated in FIGS. 1–6, a length of raw or uncured rubber tube is first corded to shape on a suitable internal form or mandrel and given only a partial cure in open steam as in a steam pressure chamber or autoclave. The retainer ring 20 is then assembled with the partially cured tube; the tube is then compressed axially and given a final cure. For example, a standard compound of neoprene type rubber such as conventionally used for making tubing for hydraulic systems, breathing tubes and similar devices is first mixed and kneaded, then extruded through an auger machine into the form of a cylindrical raw rubber tube. Such a tube, corded into the desired spiral corrugated shape on an elongated internal mandrel is heated for about four to about six minutes, preferably about five minutes in a steam heater with the steam in the range of from about 57 pounds gauge to about 63 pounds gauge, preferably being held close to 60 pounds gauge and a nominal temperature of about 300° F. After this preliminary or partial cure and removal from the heater the rubber tube is cooled as by water spray, the cord is unwrapped and the tube is stripped from the internal form as by the use of internal air pressure. It has the general form and shape illustrated somewhat diagrammatically in FIGS. 7 and 8 and constitutes a preform or intermediate manufacturing product.

The ends of this preform tube, and which are to constitute the sheath portion of the retainer ring 18 and the connector portion 28 of the flexible tube 1, previously described, are in the form of cylindrical tubular end portions 18a and 28a respectively. Between such end portions extends a corrugated body portion which, when the device is completed, forms the body portion of the corrugated tube 1. The body of the preform 1a has a relatively coarse spiral ridge and successive turns of the spiral groove are relatively widely spaced compared to the ridge and groove of the body portion of the flexible rubber tube 1 of FIGS. 1–6. This is for the reason that it is not feasible to make a spirally corrugated tube having closely spaced convolutions such as shown in FIG. 1, by conventional cording technique. It is possible, however, to make a partially cured preform in the extended or coarsely spiralled shape of FIGS. 7 and 8 and to then compress such preform axially to bring the successive convolutions of the corrugated body into close juxtaposition, the tubing being confined in the axially shortened position during a second or final curing step, as will appear.

In the case of a tube which is to be provided on one end with a sheathed rigid ring such as the circular radial retainer flange 18 previously described, it is convenient and advantageous to enclose the metal ring 20 by wrapping it in the rubber of the cylindrical end portion 18a while the rubber blank is in the partially cured relatively soft and easily worked preform stage. To do this, the ring 20 is first placed over and about one, the upper, end portion 18a and located against the endmost portion or turn of the projecting rib or corrugation which delineates the body portion of the preform 1a. The rubber of the cylindrical end portion 18a is then wrapped about the ring 20 by folding it radially outwardly, around the outer periphery of the ring in a reverse bend and against the flat inner face of the ring. The circular end of the cylindrical end portion 18a after having been drawn about the ring 20 is pressed into place between the ring and the endmost convolution of the corrugated body of the preform so as to abut the tube approximately at the juncture of such end portion and the corrugated body. This folding and shaping of the cylindrical tube portion 18a is readily accomplished manually when the rubber compound is only partially cured as it is in the preform stage after the five minute cure referred to. When the ring 20 is thus enclosed in the partially cured rubber of the preform the device appears as shown in FIGS. 8 and 10 and represents an intermediate product in the manufacturing process.

In order to provide the desired closely spaced convolutions shown in FIG. 1, the raw rubber tube in the preform stage of FIGS. 7 and 8 is much longer than the intended final product, the coarse convolutions of the preform being axially compressed or shortened about 40% to about 80%, usually in the range of from about 55% to about 65%. Generally, the finished tube is approximately ⅓ the length of the preform.

To support and confine the rubber during the final cure, it is mounted on a suitable mandrel such as a straight piece of tubular steel pipe 46 (FIG. 11) of circular section fast on a base 47, which may be a steel plate to the flat upper surface of which the pipe 46 is welded in abutting normal relation or into which the pipe mandrel is recessed and suitably secured. The rubber preform with the enclosed metal ring 20 assembled as shown in FIG. 8, is placed over the mandrel 46, the rubber tube being fed over free end 48 of the mandrel, retainer end foremost, so that the retainer 18 seats against flat upper surface 49 of the mandrel base 47. The rubber tube is compressed axially as it is fed onto the mandrel 46 until it takes the form shown in FIG. 11 in which the walls of adjacent convolutions are in contact with one another, or substantially so.

To relieve the tubular end portion 28a of the preform from axial load which might cause it to crumple or otherwise deform during the heat of the final cure, a cylindrically surfaced collar or spacing bush 50 of relatively hard rubber is provided and placed so as to be received over and about the tubular end portion 28a. One end face of the bush engages the end face of the uppermost convolution of the compressed preform over an annular area of contact and the tube end portion is laterally confined between and supported by the mandrel 46 on the inside and the cylindrical inside surface of the thrust bush 50 on the outside. A metal pin 52 is received through aligned holes in the mandrel tube 46 so as to be positioned in diametrical relation to the mandrel. The ends of this pin extend radially beyond the spacing bush 50, the pin serving to hold the bush 50 against axial displacement and thereby to confine the compressed preform between the bush and the flat surface 49 of the base 47.

While so compressed and confined, and with the metal retainer ring 20 enclosed in the integral rubber sheath formed of the folded end portion 28a of the tubular preform, the assembly is placed in a suitable steam heater or autoclave and given a final heating or curing treatment suitable for the particular rubber compound used. In the example referred to, a final cure of about 25 minutes in steam at the temperature and pressure specified gives good results and obtains physical characteristics of about 1700 pounds per square inch tensile strength, about 225% elongation, durometer of about 70, specific gravity about 1.42, with good tear and flexing in a neoprene rubber of the type mentioned.

After the final curing, the assembly is cooled as by spraying with or dipping in cold water while the tube remains confined on the mandrel; the pin 52 is withdrawn, releasing the spacing bush 50 and permitting the cured corrugated tubing to be withdrawn axially from over the free end of the mandrel 46, the finished product having an appearance approximately as illustrated in FIG. 13.

For purposes of illustration, the preform 1a and the corrugated hose or tubing 1 resulting therefrom, shown in FIGS. 7, 8, 11 and 13, is essentially the same as the flexible corrugated tube 1 shown in FIG. 1, it being apparent, however, that the FIG. 1 tube has a great many more convolutions and is therefore longer than the final product of FIG. 13. It is to be understood that the principles of the present invention may be utilized in making a flexible corrugated tube of any desired length with suitable adjustments in the lengths of the preform, FIGS. 7 and 8, and the curing mandrel, FIG. 11.

The external bush 50 is longer than the end portion 28a which it supports so that no axial load is imposed on or carried by the tubular portion of the preform during the final cure.

The present invention thus provides a novel combination of a flexible corrugated rubber tube and end connector assemblies of specialized geometry for connecting the tube to spaced rigid members of an agricultural implement or a machine for relative lateral movement as well as for relative movement of the rigid members toward and away from one another, such as the movements that occur in grain and fertilizer drills and similar equipment. A flexible rubber tube of the type herein contemplated can be quickly and easily installed in such equipment by a person of ordinary skill without any special tools or instructions. Moreover, the relatively wide radial reaction face of the retainer 18 and the outwardly spaced legs 32, 33 of the lower fitting 31 permit the corrugated tubing to be fitted into and onto different sizes of spouts and boots.

The present process permits inexpensive manufacture of corrugated flexible rubber tubing having an integral cylindrical attaching portion at one end and enclosing in an integral sheath at the other end a rigid metal ring to provide a retainer for holding such other end in assembled relation in the circular opening of a rigid machine part.

In accordance with the patent statutes, the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details or process disclosed.

What we claim and desire to secure by United States patent is:

1. A flexible tube assembly for connection to a machine part or the like having an opening and a shoulder about the opening, said assembly comprising as an integral rubber member a resilient tubular body, an annular neck on one end of such body, and a sheath on the neck, the sheath, in the normal unstressed condition of the rubber member, comprising a pair of resilient rings disposed in confronting parallel relation, said rings each having spaced inner and outer annular peripheries, one ring having its annular peripheries integrally connected one to the neck and the other to one of the peripheries of the other ring, and a third ring of rigid material disposed between the rings of said pair and normally held captive thereby independently of and apart from any connection to a machine part, one ring of the pair being adapted for deformation of one of its peripheries and bending out of said confronting relation in removing and replacing the rigid ring, said deformable and bendable ring, when so bent and deformed, being adapted to return by inherent resiliency to said confronting ring capturing relation, the neck being receivable within the opening of such a machine part with one ring of the pair engaged against the shoulder in the provision of an interlocking connection between the machine part and the assembly and the rigid ring being larger than such machine part opening and capable of retaining its shape to prevent being drawn through said opening.

2. A flexible tube assembly as claimed in claim 1 in which the body and the sheath of the rubber member are generally circular in section and the sheath has a circular outer periphery of greater diameter than the rubber body to permit assembly of the tube with such a machine part by advancing the tube axially through the opening with that end of the tube foremost which is opposite the sheath and engaging the sheath against the shoulder to locate the tube in predetermined relation to the machine part.

3. A flexible tube assembly as claimed in claim 1 in which the rigid ring has concentric inner and outer circular peripheries and the body is formed with corrugations having internal and external crests which generate concentric cylindrical surfaces the smaller of which is of less diameter than the inner periphery and the larger of which is of less diameter than the outer periphery of the rigid ring.

4. A flexible tube assembly as claimed in claim 1 in which the body is formed with corrugations having external crests lying in a cylindrical surface, the inner periphery of one of the rings of the sheath being in closely surrounding relation to the neck and defining therewith a circular slit, and said slit being of less diameter than said cylindrical surface.

5. In combination, an agricultural implement having as one component a machine part which comprises a spout with inwardly directed flange means surrounding and defining a bottom circular opening and a flexible tube assembly as defined in claim 1, the tubular body of the assembly being received through the bottom opening and adapted to conduct granular materials received in the spout downwardly therefrom toward the ground over which the implement is travelled, the weight of the tube assembly being carried by said flange means and compressing one of the resilient rings between the rigid ring and the flange means to resist unwrapping of the sheath from about the rigid ring.

6. In the combination defined in claim 5 the tubular body of the tube assembly being formed with circumferentially extending corrugations having outer peripheries lying in a circular cylinder of larger diameter than said opening in the spout, said flange means being received between the sheath and the uppermost corrugation of the tubular body in the provision of an interlock to limit relative shifting of the tube assembly in the spout.

References Cited in the file of this patent

UNITED STATES PATENTS

| | | |
|---|---|---|
| 1,684,396 | Hinnekens | Sept. 18, 1928 |
| 1,727,281 | Fulton | Sept. 3, 1929 |
| 2,026,996 | Raflovich | Jan. 7, 1936 |
| 2,354,045 | Nystrom et al. | July 18, 1944 |
| 2,713,381 | Seck | July 19, 1955 |
| 2,861,527 | Phillips | Nov. 25, 1958 |
| 2,894,661 | Simkins | July 14, 1959 |